United States Patent [19]

Liu et al.

[11] Patent Number: 4,865,908

[45] Date of Patent: Sep. 12, 1989

[54] COATED, ORIENTED POLYMER FILM LAMINATE

[75] Inventors: Leland L. Liu, Macedon; Robert E. Touhsaent, Fairport, both of N.Y.

[73] Assignee: Mobil Oil Corporation, New York, N.Y.

[21] Appl. No.: 99,247

[22] Filed: Sep. 21, 1987

Related U.S. Application Data

[63] Continuation-in-part of Ser. No. 837,116, Mar. 7, 1986, Pat. No. 4,695,503.

[51] Int. Cl.$^4$ .................. B32B 9/00; B32B 27/00; B32B 27/10

[52] U.S. Cl. .................. 428/248; 428/286; 428/288; 428/383; 428/387; 428/391; 428/463; 428/461; 428/508; 428/910; 428/509; 428/510; 428/511; 428/513; 428/514; 264/176.1

[58] Field of Search .................. 428/516, 518, 520, 461, 428/463, 248, 286, 288, 387, 383, 391, 508, 509, 511, 510, 513, 514

[56] References Cited

U.S. PATENT DOCUMENTS

| | | |
|---|---|---|
| 3,753,769 | 8/1973 | Steiner . |
| 3,922,469 | 11/1975 | Bayer . |
| 4,089,721 | 5/1978 | Sauder . |
| 4,125,662 | 11/1978 | Weiner et al. . |
| 4,230,767 | 10/1980 | Isaka et al. . |
| 4,235,365 | 11/1980 | Yoshii et al. . |
| 4,275,119 | 6/1981 | Weiner . |
| 4,275,120 | 6/1981 | Weiner . |
| 4,297,411 | 10/1981 | Weiner . |
| 4,439,493 | 3/1984 | Hein et al. . |
| 4,447,494 | 5/1984 | Wagner, Jr. et al. . |

FOREIGN PATENT DOCUMENTS 0002606  6/1979  European Pat. Off. .

Primary Examiner—P. C. Ives
Attorney, Agent, or Firm—Alexander J. McKillop; Charles J. Speciale

[57] ABSTRACT

A coated, oriented polymer film laminate is provided which comprises:

(a) an oriented core layer having an upper face and a lower face, said core layer being fabricated from a polypropylene homopolymer;

(b) an oriented layer applied to the lower face, and optionally, to the upper face, of core layer (a), said layer being fabricated from a member of the group consisting of copolymer or blend of copolymers, homopolymer or blend of homopolymers, a blend of at least one copolymer and at least one homopolymer, terpolymer or blend of terpolymers, and a blend of at least one terpolymer and at least one homopolymer or at least one copolymer;

(c) a coating layer applied to the upper face of core layer (a), or, where layer (b) has been applied thereto, to the exposed surface of said layer (b), and;

(d) an adhesively bonded substrate or a coating composition applied directly to the exposed surface of layer (b) applied to the lower face of core layer (a).

32 Claims, No Drawings

COATED, ORIENTED POLYMER FILM LAMINATE

CROSS REFERENCE TO RELATED APPLICATION

This application is a continuation-in-part of commonly assigned copending U.S. patent application Ser. No. 837,116, filed Mar. 7, 1986 now U.S. Pat. No. 4,695,503.

BACKGROUND OF THE INVENTION

This invention relates to the field of laminated polymer films and, more particularly, to such films provided with coatings intended to impart special properties thereto such as sealability, machinability, and the like, making the films especially suitable for packaging applications.

U.S. Pat. No. 3,753,769 describes an acrylic based terpolymer coating composition, adapted for use in coating polyolefin films, comprising an interpolymer of (a) from about 2 to about 15 parts by weight of an alpha-beta monoethylenically unsaturated carboxylic acid and (b) from about 85 to about 98 parts by weight of neutral monomer esters comprising an alkyl acrylate ester and an alkyl methacrylate ester. When applied to a suitable substrate film, e.g., oriented polypropylene, the foregoing coating composition confers hitherto unavailable properties on the film such as improving its heat seal properties while simultaneously improving its blocking characteristics, hot slip properties, stiffness, and optical properties. There is, however, no suggestion in U.S. Pat. No. 3,753,769 of applying the coating composition to a laminate.

U.S. Pat. Nos. 4,125,662; 4,230,767; 4,235,365; 4,275,119; 4,275,120; 4,291,092; 4,297,411; 4,439,493; and, 4,447,494 each discloses a polymer structure including a base layer of oriented polypropylene and a surface, or skin, layer of an olefin copolymer, e.g., ethylene-propylene copolymer, in some cases blended with another olefin resin. There is no hint in these disclosures, however, of applying a coating composition such as described in U.S. Pat. No. 3,753,769, supra, to such structures.

SUMMARY OF THE INVENTION

In accordance with the present invention, a coated, oriented polymer film laminate is provided which comprises:

a) an oriented core layer having an upper face and a lower face, said core layer being fabricated from a polypropylene homopolymer;

b) an oriented layer applied to the lower face, and optionally, to the upper face, of core layer (a), said layer being fabricated from a member of the group consisting of copolymer or blend of copolymers, homopolymer or blend of homopolymers, a blend of at least one copolymer and at least one homopolymer, terpolymer or blend of terpolymers, and a blend of at least one terpolymer and at least one of a homopolymer and a copolymer;

c) a coating layer applied to the upper face of core layer (a), or, where layer (b) has been applied thereto, to the exposed surface of said layer (b); and d) an adhesively bonded substrate or a coating composition applied directly to the exposed surface of layer (b) applied to the lower face of core layer (a). It should be noted that when layer (b) is applied to the upper face of core layer (a) as well as the lower face, the composition of the two (b) layers can differ.

The foregoing polymer film is particularly useful in packaging applications where coating layer (c) contributes good heat sealability and machinability as well as other useful properties and oriented layer (b) provides excellent wet-out and adhesion to water-based inks and other water-based coatings. In addition, when the exposed surface of layer (b) is applied to a substrate such as another polymer film, a metal foil, paper, etc., through an adhesive, the presence of said layer (b) makes it possible to achieve significantly higher bond strengths between the polymer film laminate and the substrate compared to that which are attainable by applying the substrate directly to the lower face of polypropylene core layer (a).

DESCRIPTION OF THE PREFERRED EMBODIMENTS

The polypropylene homopolymer of the core layer (a) is preferably an isotactic polypropylene having a density of from 0.90 to 0.91 g/cc and a melt flow index of from 1 to 4 g/10 mins. at 230° C./2.16 Kp/cm$^2$ pressure (as measured in accordance with DIN 53 735). For present purposes, polypropylenes containing small amounts of other interpolymerized alpha-olefins such as 1-butene, e.g., not exceeding about 2 weight percent, are included within the expression "polypropylene homopolymer".

Layer (b) which is applied to the lower face of core layer (a), and optionally, to the upper surface of core layer (a) as well, can be fabricated from copolymers, homopolymers and blends of homopolymers, blends of copolymer(s) and homopolymer(s), and blends of copolymers and terpolymers heretofore employed for this purpose. Illustrative of copolymers which can be used in providing layer (b) of the present laminates are ethylene-propylene copolymers containing at least 1, and preferably from about 1.5 to about 10, weight percent, ethylene, and ethylene-propylene-butylene terpolymers containing from about 1 to about 10, and preferably from about 2 to about 6, weight percent ethylene and from about 80 to about 97, and preferably from about 88 to about 95, weight percent propylene. Homopolymers which can be used in layer (b) include low density polyethylene (LDPE), linear low density polyethylene (LLDPE), medium density polyethylene (MDPE), and high density polyethylene (HDPE). Examples of such polymers are disclosed in U.S. Pat. No. 4,565,739, U.S. Pat. No. 4,613,547, U.S. Pat. No. 4,564,556, and U.S. Pat. No. 4,578,316, the contents of which are incorporated herein by reference.

Homopolymers such as those set forth above can be utilized in layer (b) in combination with from about 1 to about 99 weight percent polypropylene homopolymer. Alternatively, blends of homopolymers which can be used can include from about 1 to about 99 weight percent polypropylene homopolymer, e.g., one which is the same as, or different from, the polypropylene homopolymer constituting core layer (a).

Copolymers which can be used in layer (b) include: ethylene-butylene copolymer having a butylene content of from about 1% to about 7%; a propylene-butylene copolymer having a butylene content of from about 1% to about 7%; ethylene-methacrylate copolymer (EMA) having a methacrylate content of from about 15% to about 30%; ethylene-vinylacetate copolymer (EVA) having a vinylacetate content of from about 2% to about 20%; and ethylene-acrylic acid copolymer (EAA) having an acrylic acid content of from about 4% to about 13%.

Blends of copolymer(s) and homopolymer(s) suitable for providing layer (b) include: a blend of from about 10 to about 90 weight percent polypropylene and from about 90 to about 10 weight percent of a copolymer of propylene (80 to about 95 mole percent) and butylene (20 to about 5 mole percent); a blend of from about 10 to about 90 weight percent polypropylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polypropylene and from about 90 to about 10 weight percent of a copolymer of ethylene (10 to about 97 mole percent) and propylene 90 to about 3 mole percent); and, a blend of from about 90 to about 10 weight percent polybutylene and from about 10 to about 90 weight percent of a copolymer of propylene (2 to about 79 mole percent) and butylene (98 to about 21 mole percent).

Coating layer (c) can, for example, be derived from any of the terpolymeric compositions disclosed in U.S. Pat. No. 3,753,769, the contents of which are incorporated by reference herein. These coating compositions contain as a film forming component a resin consisting essentially of an interpolymer of (a) from about 2 to about 15, and preferably from about 2.5 to about 6, parts by weight of an alpha-beta monoethylenically unsaturated carboxylic acid selected from the group consisting of acrylic acid, metaacrylic acid, and mixtures thereof, and (b) from about 85 to about 98, and preferably from about 94 to about 97.5, parts by weight of neutral monomer esters, said neutral monomer esters preferably comprising (1) methyl acrylate or ethyl acrylate and (2) methyl methacrylate. These interpolymer compositions are further characterized by preferably comprising from about 30 percent to about 55 percent by weight of methyl methacrylate when said alkyl acrylate is methyl acrylate, and from about 52.5 percent to about 69 percent by weight of methylmethacrylate when said alkyl acrylate is ethyl acrylate. As more fully described infra, such coating compositions can be applied to the films herein in a variety of ways including in the form of ammoniacal solutions.

Similarly useful are copolymeric coating compositions prepared exclusively from the foregoing neutral monomer esters. These coating compositions are advantageously applied to the film laminates in the form of emulsions.

Coating layer (c) can also be based on any of the known and conventional polyvinylidenechloride (PVDC) compositions heretofore employed as coatings in film manufacturing operations, e.g., any of the PVDC materials described in U.S. Pat. Nos. 4,214,039 and 4,447,494, preferably with prior application of a primer layer to enhance adhesion of the PVDC coating layer to the film surface to which it is applied. Commercially available PVDC latexes having a vinylidene chloride content of at least 50% and preferably from about 75% to about 92% may be employed. The PVDC can also be provided as a copolymer of vinylidenechloride and one or more other ethylenically unsaturated comonomers including alpha, beta ethylenically unsaturated acids such as acrylic and methacrylic acids; alkyl esters containing 1–18 carbon atoms of said acids, such as methylmethacrylate, ethyl acrylate, butyl acrylate, etc.

In addition alpha, beta ethylenically unsaturated nitriles such as acrylonitrile and methacrylonitrile and monovinyl aromatic compounds such as styrene and vinyl chloride comonomers can be employed. Specific PVDC latexes contemplated comprise: 82% by weight vinylidene chloride, 14% by weight ethyl acrylate and 4% by weight acrylic acid. Alternatively a polymer latex comprising about 80% by weight vinylidene chloride, about 17% by weight methyl acrylate and about 3% by weight methacrylic acid can likewise be employed.

A variety of additives conferring special properties upon these coating compositions are advantageously incorporated therein. Thus, when the polymer film laminate of this invention is utilized in packaging, a "hot slip" agent, i.e., a material which improves the coefficient of friction of the film at the elevated temperatures encountered in heat sealing operations, can be present as a component of the coating layer. Suitable hot slip agents include finely divided (e.g., from about 10 to about 200 millimicrons) silicas, diatomaceous earth, calcium silicate, bentonite, clay, etc., at a level of from about 5 to about 60, and preferably from about 10 to about 45, weight percent of interpolymer. Anti-blocking agents, i.e., materials which counteract the tendency of film to adhere to itself, many of which also serve to reduce the coefficient of friction of coating layer (c), constitute another useful type of additive. Numerous wax and wax-like materials are known to function as anti-blocking agents. Representative of such materials are (i) the vegetable waxes, e.g., carnauba which is preferred, quericury, palm, raffia, cocoa, candelilla, rhimba, ocoxilla, banana, esparto, flax, hemp, cottonseed, kapok, sugar cane, banaboo leaf, bayberry, ucuhuba, Japan, cocoa butter, fiber, reed, ocuba, godang, blanophore waxes, etc.; (ii) the animal waxes, e.g., lanolin, spermaceti, beeswax, stearic acid, Chinese insect wax, shellac wax, etc.; (iii) the mineral waxes, e.g., ozokerite, Montan, Utah, paraffin, ceresin, microcrystalline, petrolatum, etc.; (iv) the artificial waxes including those obtained from the distillation of paraffin base petroleum, ozokerite, and from the destruction distillation of lignite and parafinaceous shales, e.g., peat wax, and the like; (v) the synthetic and manufactured waxes which include the fatty alcohols, e.g., cetyl alcohol, stearyl alcohol and other alcohols derived from fatty acids, and the like; esters of higher alcohols and fatty acids including esters of cetyl alcohol, stearyl alcohol, and the like with stearic acid, palmitic acid, and the like; fatty acids including stearic, palmitic, myristic, and other fatty acids derived from tallow, cottonseed oil, coconut oil and soybean oil; glycerol esters such as glycerol tri-stearate, glycol distearate and glycerol monostearate, and the like; the mono-and di- fatty acid esters of glycols such as ethylene glycol mono- and di-stearate, diethylene glycol mono- and di-palmitate, propylene glycol mono-and di-stearate, and the sorbitol stearates, the pentaerythritol stearates, the polypentaerythritol fatty acid esters, and the like; hydrogenated and partially hydrogenated fatty oils such as cottonseed, coconut, peanut, soybean, castor, fish whale and other vegetable and/or animal oils, and the like; the polyglycols generally having a molecular weight greater than about 500 (e.g. the Carbowaxes), and the like; the chlorinated naphthalenes, and the like; complex nitrogen derivatives of higher fatty acids, and the like; glycerine and glycol esters of acids derived from Montan wax, and the like; waxy ketones, amines, amides and nitriles such as 16-hentriacontanone, octadecyl-hexadecyl amine, higher molecular weight aliphatic amides, octadecanamide, hexadecanamide, octadecane nitrile, hexadecane nitrile, and the like; solid hydrocarbons with melting points up to 210° C., e.g., polyethylene wax, and wax-like polymerization products of one or more alpha-olefins, and the like; oxidized paraffin or microcrystalline waxes, and the like; and mixtures of two or more of the foregoing.

In addition to functioning as anti-blocking agents, the above-described wax and wax-like materials also function to improve the "cold-slip" properties of the films coated therewith, i.e., the ability of a film to satisfactorily slide across surfaces at ambient temperatures Only a minor amount of such materials, generally on the order of from about 1.5 to about 10, and preferably from about 3 to about 6, weight percent by total weight of coating composition need be employed for good results.

Before applying the coating composition to the appropriate substrate, the upper surface of core layer (a), or where layer (b) is optionally present thereon, the exposed surface of the latter layer, is treated to increase its surface energy and therefor insure that the coating layer (c) will be strongly adherent thereto thereby eliminating the possibility of the coating peeling or being stripped from the film laminate. This treatment can be accomplished employing known techniques such as, for example, film chlorination, i.e., exposure of the film surface to gaseous chlorine, treatment with oxidizing agents such as chromic acid, hot air or steam treatment, flame treatment and the like. Although any of these techniques is effectively employed to pretreat the film surface, a particularly desirable method of treatment is the so called electronic treatment method which comprises exposing the film surface to a high voltage corona discharge while passing the film between a pair of spaced electrodes. After electronic treatment of the film surface, the coating composition is then applied thereto.

In applications where even greater coating-to-film adherence is desired, i.e., greater than that resulting from treatment of the film surface by any of the afore-discussed methods, an intermediate primer coating can be employed to increase the adherence of the coating composition to the film. In this case, the film is advantageously first treated by one of the foregoing methods, electronic treatment being a preferred method, to provide increased active adhesive sites thereon (thereby promoting primer adhesion) and to the thus treated film surface there is subsequently applied a continuous coating of a primer material. Such primer materials are well known in the prior art and include, for example, epoxy and poly(ethylene imine). The primer provides an overall adhesively active surface for thorough and secure bonding with the subsequently applied coating composition. The primer is applied to the base film by conventional solution coating means, for example, by mating roller application.

Extrusion coating and coextrusion are two types of well known methods by which the coating composition can be applied to the polymer film laminate herein to provide layer (c) thereof. For example, when extrusion coating is used, the polymer film laminate, itself advantageously a product of coextrusion, is stretched in the machine direction, extrusion coated with the coating composition and then stretched perpendicularly in the transverse direction. When coextrusion is utilized, the polymer film laminate is coextruded with the coating composition and the entire structure is then oriented, preferably by biaxial stretching.

It is also possible to apply the coating composition to the upper surface of the polymer film laminate as a solution, e.g., one prepared with an organic solvent such as an alcohol, ketone, ester, etc. However, since the coating composition can contain insoluble, finely divided inorganic materials which are difficult to keep well dispersed in organic solvents, it is preferable that the coating composition be applied from aqueous media. The coating is applied to the treated surface of core layer (a) (or optional layer (b) as the case may be) in any convenient and known manner, such as by gravure coating, roll coating, dipping, spraying, etc. The excess aqueous solution can be removed by squeeze rolls, doctor knives, etc.

The coating composition should be applied in such amount that there will be deposited upon drying a smooth, evenly distributed layer, generally on the older of from about 0.01 to about 0.2 mils thickness (equivalent to about 0.2 to 3.5 grams per 1,000 sq. in. of film). In general, the thickness of the applied coating is such that it is sufficient to impart the desired heat sealability and stiffness characteristics to the base film structure.

The coating on the film is subsequently dried by hot air, radiant heat or by any other convenient means. Upon drying a non-water soluble, clear, adherent, glossy coated film useful, for example, as a packaging film.

The total thickness of the polymer film laminate of this invention, and the thickness of the individual layers comprising same, are not critical and will be selected to meet particular service requirements. So, for example, when used in packaging, the total thickness of the oriented laminate structure can be on the order of from about 0.3 to about 3 mils, with core layer (a) representing about 90 percent of the total, layer(s) (b) representing about 5 percent of the total and coating layer (c) comprising the balance.

While layers (a), (b) and (c) constituting the polymer film laminate herein can be individually extruded and thereafter brought together to provide the finished laminate, it is preferable to coextrude layer (a) and (b) and to coat layer (c).

Orientation of core layer (a) and layer(s) (b) is achieved by stretching the film utilizing any of the procedures and equipment known to accomplish this For example, a coextruded laminate of layers (a) and (b) can initially be stretched in the machine direction for from four to eight times and in a transverse direction from four to eight times at a drawing temperature of from about 100° C. to about 160° C. employing commercially available sequential biaxial orientation apparatus.

A wide variety of substrate materials and coatings are applied to the exposed surface of layer (b) which has previously been applied to the lower face of core layer (a). Among the substrates which are useful herein are polymer films/laminates; metal foil, e.g., of aluminum; cellulosic webs, e.g., numerous varieties of paper such as corrugated paperboard, kraft paper, glassine, cellophane, cartonboard, etc.; non-woven tissue, e.g., spun-bonded polyolefin fiber, melt-blown microfibers, etc., employing a suitable adhesive, e.g., a hot melt adhesive such as low density polyethylene, ethylene-methacrylate copolymer, water-based adhesive such as PVDC latex, and the like, preferably with prior surface treatment of layer (b) by corona discharge, flame, etc., as previously described. Any of a variety of coatings can also be applied to the lower face of layer (b)including water-based inks, adhesives, and the like.

Surprisingly, it has been found that the bond strengths between the film laminate and the substrate/coating are significantly higher with the aforedescribed arrangement than those obtained by bonding the substrate/coating directly to polypropylene homopolymer core layer (a).

The following examples further illustrate the polymer film laminate of this invention.

polymer film laminate prepared in accordance with this invention was provided with a coating of water-based ink applied to the exposed surface of layer (b) and the wet out and adhesion properties of the ink were compared with those obtained for a coated, oriented film n which the water-based ink was superimposed upon a layer of coating composition A. The structures of the various films and the results of the foregoing measurements are set forth in the Table below.

TABLE

| | | Film Properties | | | | | |
|---|---|---|---|---|---|---|---|
| Example | Film | Total Film Thickness (mills) | Polymer Adhesive | Substrate/ Coating | Lamination Bond Strength (g/in.) | Wet Out (%) | Adhesion (%) |
| 1(a)* | A/EP/PP | 0.57 | PE | PXS | 56 | — | — |
| 1(b) | A/PP/EP | 0.57 | PE | PXS | 79 | | |
| 2(a)* | A/EP/PP | 0.57 | PE | Glassine | 32 | — | — |
| 2(b) | A/PP/EP | 0.57 | PE | Glassine | 54 | — | — |
| 3(a)* | A/EP/PP | 0.57 | EMA/LDPE | PXS | 354 | — | — |
| 3(b) | A/PP/EP | 0.57 | EMA/LDPE | PXS | 820 | — | — |
| 4(a)* | EP/PP/A | 0.57 | PE | AF | 12 | — | — |
| 4(b)* | A/EP/PP | 0.57 | PE | AF | 22 | — | — |
| 4(c) | A/PP/EP | 0.57 | PE | AF | 34 | — | — |
| 5 | A/PP/EP | 0.57 | PE | Board | 750 | — | — |
| 6(a) | A/PP/EP | 0.57 | — | Ink | — | 90 | 100 |
| 6(b)* | A/PP/A | 0.75 | — | Ink | — | 90 | 100 |

*Film is outside the scope of this invention.

EXAMPLES 1-6

Known and conventional coextrusion and orientation techniques were employed in preparing a number of coated, oriented polymer film laminates within the scope of this invention and, for comparison purposes, coated, oriented polymer film/laminates outside the scope of the invention. In the case of those films which were further laminated to a substrate, a coextruded layer of hot melt polymeric adhesive was applied to the lower face of the composite film. Coating composition (c) was uniformly applied to all of the films by means of a gravure roll coater.

In the table below, the following symbols/terms have the meanings indicated:

A: Terpolymer coating composition in accordance with U.S. Pat. No. 3,753,769 prepared from 4 weight percent methacrylic acid, 45 weight percent methyl acrylate, balance methyl methacrylate, containing 28 weight percent colloidal silica, 3.5 weight carnuba wax PP: Polypropylene homopolymer of 4 gm/10 min melt flow, 96 weight percent isotacticity EP: Ethylene-propylene copolymer containing about 3 weight percent ethylene PE: Low density polyethylene EMA/LDPE: 30 weight percent ethylene-methacrylate acid copolymer containing about 90 weight percent ethylene with 70 weight percent low density polyethylene PXS: Polyvinylidene chloride-coated oriented polypropylene Glassine: Polyvinylidene chloride-coated glassine AF: Aluminum foil Board: Paperboard Ink: Water-based white ink In Examples 1 to 5, coated, oriented film laminates within and outside the scope of the invention were bonded to a variety of substrates employing two different polymeric adhesives and the lamination bond strengths of the laminates were measured employing standard procedures. In Example 6, a coated, oriented These data (Examples 1-5) demonstrate that in every case where a substrate was applied to layer (b) rather than directly to polypropylene homopolymer core layer (a), the resulting lamination strength was significantly higher in the case of the former compared with that of the latter. The data also show (Example 6) that the wet out and adhesion values of ink applied to layer (b) were substantially the same as the values obtained for a film possessing a specially prepared ink-receptive coating.

What is claimed is:

1. A coated, oriented polymer film laminate which comprises:

a) an oriented core layer having an upper and a lower face, said core layer being fabricated from a polypropylene homopolymer;

b) an oriented layer applied to at least the lower face of core layer (a), said layer being fabricated from a member of the hydrocarbon group consisting of copolymer or blend of copolymers, homopolymer or blend of homopolymers, blend of at least one copolymer and at least one homopolymer, terpolymer or blend of terpolymers, and a blend of at least one terpolymer in combination with at least one homopolymer or one copolymer;

c) a coating layer applied to the upper face of core layer (a), said coating layer being derived from a polyvinylidene chloride polymer or copolymer; and, d) a layer applied directly to the exposed surface of layer (b) applied to the lower face of core layer (a), said layer (d) being selected from the group consisting of adhesively bonded substrates of polymer film, polymer film laminate, metal foil, cellulosic web and non-woven tissue; and water-based coating.

2. The polymer film laminate of claim 1 wherein coating layer (c) and/or adhesively bonded substrate or coating composition (d) is applied to a film surface which has been previously treated to increase the energy of said surface and, optionally also primed.

3. The polymer film laminate of claim 2 wherein core layer (a) is fabricated from an isotactic polypropylene.

4. The polymer film laminate of claim 2 wherein layer (b) is fabricated from an ethylene-propylene copolymer containing from about 1.0 to about 10 weight percent ethylene.

5. The polymer film laminate of claim 2 wherein layer (b) is fabricated from an ethylene-propylene copolymer containing from about 1.5 to about 10 weight percent ethylene.

6. The polymer film laminate of claim 2 wherein said copolymer is selected from the group consisting of ethylene-butylene copolymer having a butylene content of from about 1% to about 7%, propylene-butylene copolymer having a butylene content of from about 1% to about 7%, ethylene methacrylate copolymer having a methacrylate content of from about 15% to about 30%, ethylene-vinylacetate copolymer having a vinylacetate content of from about 2% to about 20%, and ethylene acrylic acid having an acrylic acid content of from about 4% to about 13%.

7. The polymer film laminate of claim 2 wherein said homopolymer is selected from the group consisting of low density polyethylene, linear low density polyethylene, medium density polyethylene and high density polyethylene.

8. The polymer film laminate of claim 2 wherein coating layer (c) comprises a polyvinylidene chloride polymer applied through a primer layer to the upper face of core layer (a) or the exposed surface of layer (b) optionally applied to the upper face of core layer (a).

9. The polymer film laminate of claim 8 wherein the vinylidene content is at least about 50%.

10. The polymer film laminate of claim 8 wherein said vinylidene content is from about 75% to about 92%.

11. The polymer film laminate of claim 1 wherein core layer (a) is fabricated from an isotactic polypropylene.

12. The polymer film laminate of claim 1 wherein layer (b) is fabricated from an ethylene-propylene copolymer containing at least about 1.0 weight percent ethylene.

13. The polymer film laminate of claim 1 wherein layer (b) is fabricated from an ethylene-propylene copolymer containing from about 1.5 to about 10 weight percent ethylene.

14. The polymer film laminate of claim 1 wherein said copolymer is selected from the group consisting of ethylene-butylene copolymer having a butylene content of from about 1% to about 7%, propylene-butylene copolymer having a butylene content of from about 1% to about 7%, ethylene methacrylate copolymer having a methacrylate content of from about 15% to about 30%, ethylene-vinylacetate copolymer having a vinylacetate content of from about 2% to about 20%, and ethylene acrylic acid having an acrylic acid content of from about 4% to about 13%.

15. The polymer film laminate of claim 1 wherein said homopolymer is selected from the group consisting of low density polyethylene, linear low density polyethylene, medium density polyethylene and high density polyethylene.

16. The polymer film laminate of claim 1 wherein layer (b) is fabricated from an ethylene-propylene-butylene terpolymer containing from about 1 to about 10 weight percent ethylene and from about 80 to about 97 weight percent propylene.

17. The polymer film laminate of claim 1 wherein layer (b) is fabricated from an ethylene-propylene-butylene terpolymer containing from about 2 to about 6 weight percent ethylene from about 88 to about 95 weight percent propylene.

18. The polymer film laminate of claim 1 wherein layer (b) is fabricated from a blend of from about 10 to about 90 weight percent ethylene-propylene-butylene terpolymer and from about 90 to about 10 weight percent polypropylene homopolymer.

19. The polymer film laminate of claim 1 wherein layer (b) is fabricated from a blend of from about 1 to about 99 weight percent polypropylene homopolymer and from about 99 to about 1 weight percent linear low density polyethylene.

20. The polymer film laminate of claim 1 wherein layer (b) is fabricated from a blend of from about 10 to about 90 weight percent of polypropylene and from about 90 to about 10 weight percent of a propylene-butylene copolymer.

21. The polymer film laminate of claim 1 wherein layer (b) is fabricated from a blend of from about 10 to about 90 weight percent polypropylene and from 90 to about 10 weight percent of a copolymer of ethylene and an alpha olefin having at least 4 carbon atoms.

22. The polymer film laminate of claim 1 wherein layer (b) is fabricated from a blend of from about 10 to about 90 weight percent polypropylene and from about 90 to about 10 weight percent of an ethylene-propylene copolymer.

23. The polymer film laminate of claim 1 wherein layer (b) is fabricated from a blend of from about 90 to about 10 weight percent polybutylene and from about 10 to about 90 weight percent of a propylene-butylene copolymer.

24. The polymer film laminate of claim 1 wherein coating layer (c) comprises a polyvinylidene chloride polymer applied through a primer layer to the upper face of core layer (a) or the exposed surface of layer (b) optionally applied to the upper face of core layer (a).

25. The polymer film laminate of claim 24 wherein said vinylidene content is from about 75% to about 92%.

26. The polymer film laminate of claim 1 wherein the vinylidene content is at least about 50%.

27. The polymer film laminate of claim 1 wherein coating layer (c) contains a hot slip agent.

28. The polymer film laminate of claim 1 wherein coating layer (c) contains an anti-blocking agent.

29. The polymer film laminate of claim 1 wherein coating layer (c) contains a cold slip agent.

30. The polymer film laminate of claim 1 wherein substrate (d) is adhesively bonded through a hot melt polymeric adhesive to the exposed surface of heat sealable layer (b) applied to the lower face of core layer (a).

31. The polymer film laminate of claim 1 wherein substrate (d) is adhesively bonded through a hot melt polymeric adhesive selected from the group consisting of low density polyethylene and ethylene-methacrylic acid copolymer to the exposed surface of heat sealable layer (b) applied to the lower face of core layer (a).

32. The polymer film laminate of claim 1 wherein layer (b) is also applied to the upper face of core layer (a) in between core layer (a) and coating layer (c).

* * * * *